Sept. 14, 1948.  F. G. HOBART  2,449,227
CRANKCASE OIL THROWER AND CRANK
PIN LUBRICATING DEVICE
Filed Jan. 25, 1945

INVENTOR.
FRANKLIN G. HOBART
BY
Paul L. Krohn
ATTORNEY

Patented Sept. 14, 1948

2,449,227

UNITED STATES PATENT OFFICE 2,449,227

CRANKCASE OIL THROWER AND CRANK-PIN LUBRICATING DEVICE

Franklin G. Hobart, Beloit, Wis., assignor to Fairbanks, Morse & Co., Chicago, Ill., a corporation of Illinois Application January 25, 1945, Serial No. 574,504

10 Claims. (Cl. 184—13)

This invention relates to improvements affording positive lubrication of engine crank pins and the like, and has reference more particularly, to a device for application to a connecting rod, to scoop or splash lubricant within the engine crankcase, and to deliver lubricant to the crankpin.

The principal object of the present invention resides in the provision of an improved device adapted for application to the connecting rod of an engine or the like, which is effective in connection with a body of lubricant in the engine crankcase, to splash lubricant from said body throughout the crankcase, and to direct and deliver lubricant to the bearing surfaces of the crankpin.

Another object is attained in the provision of a device of the character indicated, which is of a unitary construction providing a body element adapted for securement between the crankpin bearing end of the connecting rod and a bearing cap secured thereto, and so constructed as to form a channel leading to the surface of the crankpin, and the device further having a projection from the body portion, adapted for dipping into a crankcase body of lubricant to scoop lubricant therefrom for splash lubrication of operating elements in the crankcase, and providing a guide surface serving to direct lubricant from the crankcase body of lubricant to and through the channel to the crankpin surface.

Further objects and advantages provided by the present invention, will appear readily from the following description of a preferred embodiment thereof, as illustrated by the accompanying drawing, wherein.

Figure 1:
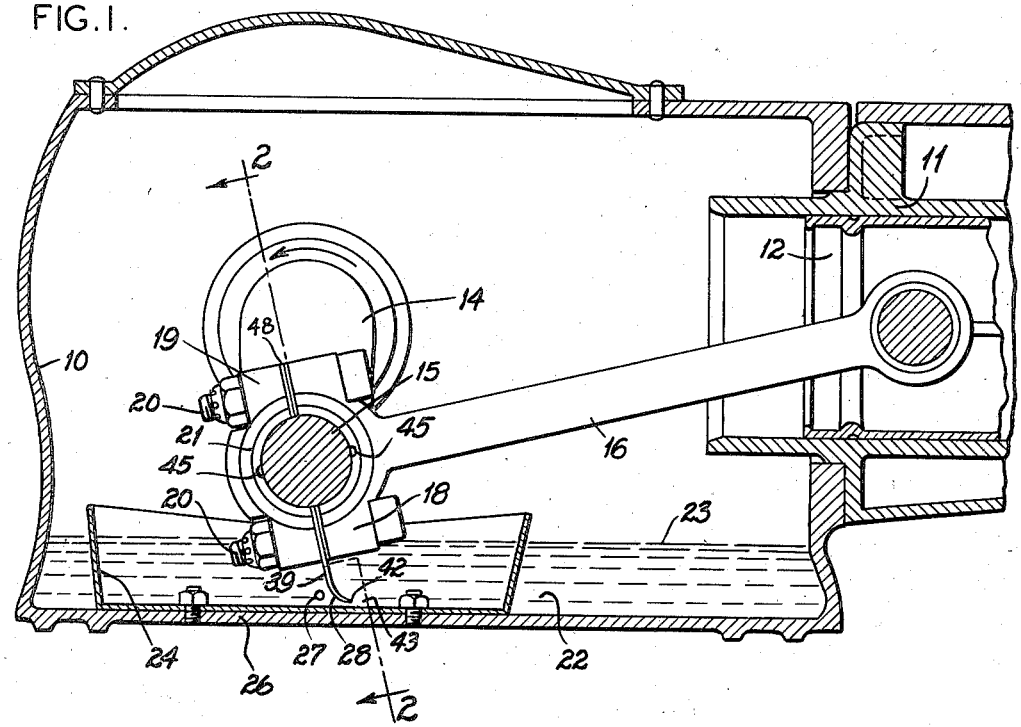
Fig. 1 is a longitudinal sectional elevation through the crankcase zone and a part of the cylinder and piston assembly of an engine, illustrating the application of the presently improved oiling device to the connecting rod and crankpin journal.

Referring now to the drawing by suitable characters of reference, the present device is shown in application to an engine of horizontal cylinder type, providing a crankcase 10 to which is secured in horizontal position, an engine cylinder 11 having a piston 12 reciprocable therein. The engine crankshaft is shown at 14, providing a crankpin 15 to which the connecting rod 16 is operatively connected, as by a bearing half 18 formed at the crank end of connecting rod 16, and a bearing cap 19 secured to rod bearing half 18 by suitable bolts 20. According to the present illustration, the cap is secured by two bolts, one at each side of the cap. Also, the rod parts 18 and 19 may have babbitt lining cast or otherwise secured in each, or other removable liners may be employed therein as desired, such being indicated at 21 in the drawing. The lower zone 22 of crankcase 10, is adapted to contain a body of lubricant indicated at 23, and lubricant is delivered therefrom into an oil pan 24 secured to the crankcase bottom wall 26, as through an opening 27 in a wall of the oil pan. The capacity of opening 27 is determined to be such as to allow a rate of oil flow into the pan sufficient to provide enough oil therein during engine operation, for the efficient operation of the presently improved oiling device.

Figure 2:
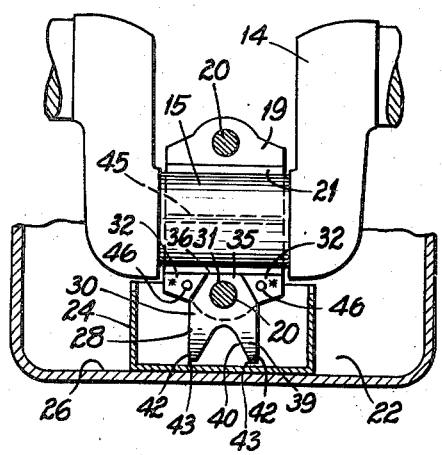
Fig. 2 is a fragmentary sectional elevation as viewed from line 2—2 in Fig. 1.
Figure 3:
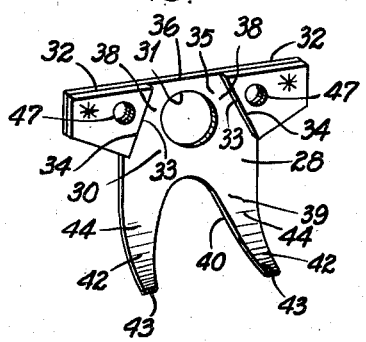
Fig. 3 is an enlarged view of the improved device.

Splash-lubrication of the moving engine parts (not shown) within the crankcase, as well as positive lubrication of the crankpin, is afforded by an improved device 28, arranged as shown in Fig. 1, on the side of the crankpin facing the oil pan 24, and mounted between the rod bearing end 18 and cap 19, the device projecting therefrom in a position to dip into the lubricant in pan 24 during crankshaft rotation, so as to disperse lubricant therefrom upwardly and through the interior of the crankcase 10. The device according to the present improvements, is formed from suitable sheet metal stock of predetermined thickness or gauge, and provides a planar body portion 30 adapted for location between the rod bearing 18 and cap 19, and a centrally located aperture 31 to receive therethrough, one of the crank-rod journal securing bolts 20. Extending laterally from opposite sides of body 30 and coplanar therewith, are projections or wing-like portions 32, each of which supports thereon a plate-like element 34. The elements 34 which may be secured to wing portions 32 in any suitable manner, as by spot-welding, serve with the body 30 to define between the cap and rod bearing end a channel 35 opening at its inner end 36, to the surface of the crank pin 15 (Fig. 2). The inner opposed margins 33 of the members 34 are of angulate trend as shown, so that channel 35 defined thereby, is of tapered extent, converging at the inner open end 36. It will be noted that in assembly, with bolt 20 extended through body opening 31, the bolt serves to define opposite passages 38 in the channel 35. Extending from body portion 30 and laterally of the crank pin connection, is a dipper portion 39 which as presently preferred, has its central portion cut away at 40 to afford a pair of spaced dipper arms 42. The arms 42 are by preference, curved as shown, and in assembly position, the curved arms project forwardly in the direction of crankshaft rotation as will appear from Fig. 1. Each arm may terminate in a bevelled or relatively sharpened, knife-like end or tip portion 43, whereby to facilitate entrance of the dipper arms into the lubricant in pan 24.

Briefly describing the function of the presently improved device, upon crankshaft rotation, the dipper arms 42 will enter and pass through the lubricant in pan 24, and in doing so, will serve to displace lubricant from the pan, as by scooping and splash-displacement, into the regions of the crankcase 10 above pan 24 for effecting lubrication of engine parts therein (not shown). At the same time, by reason of the curvature of dipper arms 42 in the direction of the crankshaft rotation, an appreciable quantity of lubricant will be thereby directed upwardly along the directing surfaces 44 of the dipper arms, to and through the passages 38 and channel 35 to the zone of crank pin 15, whereby lubricant will be thus delivered in a positive manner, to the bearing surfaces defined by the engaging surfaces of the crank pin 15 and the bearing liners 21. In order to assist the flow of lubricating oil along the surfaces of crank pin 15 and liners 21, the liners may be notched or channeled longitudinally of each, as indicated at 45 in Fig. 1, and in broken lines in Fig. 2.

As is common practice with crank-pin connections of the character described, the bearing cap 19 is centered with respect to the rod bearing end 18, and held against lateral or angular displacement, by suitable pins or dowels 46 indicated in Fig. 2, one near each end of the cap with its ends seating in the cap and rod bearing end 18. In order to accommodate these pins, the oiling device is apertured as at 47, in the body wing portions 32 and associated plate elements 34, through which the pins or dowels pass. The cap dowels projecting through the wing portions of the oiling device, thus also afford a means for preventing lateral or angular shifting of the device, as is now apparent.

A further advantage offered by the presently improved oiling device, is found in the utility of the body structure, comprised of the portion 30 and the elements 34 superposed on the body wing portions 32, as a shim coacting with a shim or shims 48 at the opposite side of the journal, for properly spacing the cap 19 and rod end 18. The cap-rod spacing may be further controlled, of course, by the application of additional shims on both sides of the journal.

With further regard to the channel-defining plate elements 34 on the body wing portions 32, while it is presently preferred to form these as separate elements, and to secure them in assembly on wing portions 32 as by spot-welding, it will appear readily, that the elements may be integral with the body wings 32. In such instance, each may be provided as an extension of wing portion 32, and then bent or turned-over into overlying engagement with the wing portions.

The presently improved oiling device as will now appear, provides for effective splashing of lubricant within the engine crankcase so as to lubricate operating parts therein, and affords positive delivery of lubricant directly to the crank pin. It also affords a device for the purpose described, which may be readily applied to existing engines, in replacement of shims between the bearing cap and connecting rod bearing end at one side of the journal connection.

Having now described the presently improved oiling device and the manner of its operation, I claim as my invention, the following:

1. In an engine providing a crankcase having a body of lubricant therein, a crankshaft having a crank pin, and a piston connecting rod having a journal connection with the crank pin, provided by a bearing-half at the crank end of the rod, and a bearing cap secured to the rod bearing-half, the combination with said crank pin connection, of means for effecting lubrication thereof from the crankcase body of lubricant, comprising a member providing a body portion located between the rod bearing-half and cap, means carried by said body portion and including relatively spaced plate-like elements, defining with said body portion a channel extending to the surface of the crank pin, and a dipper portion projecting from said body portion in a position to dip into said crankcase body of lubricant upon crankshaft rotation, said dipper portion being adapted to direct and guide lubricant from said lubricant body, into and through said channel to the crank pin surface.

2. In an engine including a crankcase having a body of lubricant therein, a crankshaft providing a crank pin, and a piston connecting rod having a bearing-half at the crank pin end of the rod, a bearing cap, and bolts securing the cap and rod bearing-half in assembly to the crank pin, the combination with said crank pin connection, of means for effecting lubrication thereof from the crankcase body of lubricant, comprising a member providing a planar body portion disposed between the rod bearing-half and cap, the body portion being apertured to receive therethrough at least one of said securing bolts, means including plate-like elements relatively spaced on and cooperating with said body portion to define an open channel extending to the surface of the crank pin, and a dipper portion projecting from the body portion in a position to dip into said crankcase body of lubricant upon crankshaft rotation, said dipper portion being adapted to direct and guide lubricant from said lubricant body, into and through said channel to the crank pin surface.

3. In an engine having a crankcase containing a body of lubricant therein, a crankshaft providing a crank pin, a piston connecting rod having a crank pin bearing-half at the crank end thereof, and a bearing cap secured to the rod bearing-half to complete the journal connection of the rod and crank pin, the combination with said journal connection, of a member seated between the rod bearing-half and cap, said member providing a dipper portion extending therefrom in a position to pass through said body of lubricant in each revolution of the crankshaft, to effect splash-displacement of the lubricant in the crankcase, said member in the portion thereof seated between the rod bearing-half and cap, having lateral projections thereon, plate-like elements on said lateral projection cooperating with said member to define a channel, extending to the surface of the crank pin, and said dipper portion of the member providing a guide surface effective as the dipper portion passes through the body of lubricant, to deliver lubricant to and through said channel, to the crank pin surface for lubrication of the crank pin.

4. In an engine having a crankcase containing a body of lubricant therein, a crankshaft providing a crank pin, a piston connecting rod having a crank pin bearing-half at the crank end thereof, a rod bearing cap, a pair of bolts securing said cap and rod bearing half in operative connection with said crank pin, and a dowel extending into said bearing half and bearing cap, the combination with said crank pin-rod connection, of a lubricant feeding member providing a planar body having opposite lateral projections co-planar with the body, a longitudinal extension from the body formed to provide spaced, lubricant directing arms curved out of the plane of the body and each terminating in a bevelled end, and plate-like elements on said lateral projections, adapted with said body to define a channel centrally of the body and open at its ends, the body being centrally apertured in the zone of the channel, and one of said lateral projections and the plate-like element thereon being apertured therethrough, said member having the body thereof and said lateral projections and plate-like elements thereon, disposed between said cap and rod bearing-half, with one of said securing bolts extended through said body aperture and said dowel extended through the aperture of said apertured lateral projection and associated plate like element, the member so disposed, having said channel open to the surface of the crank pin, and the longitudinal body extension providing said arms, in a position such that said arms dip into said crankcase body of lubricant upon crankshaft rotation, and act to direct and deliver lubricant therefrom to the zone of said channel, for passage therethrough to the crank pin surface, whereby to effect lubrication of said crank pin.

5. As an article of manufacture, a device for the purpose described, comprising a sheet metal member formed to provide a planar body, opposite lateral projections on said body, plate-like elements on said projections cooperating with said body to define a channel, and said member further providing a continuation of said planar body, formed to provide spaced arms each curved out of the plane of said body.

6. As an article of manufacture, a device for the purpose described, comprising a sheet metal member providing a planar body of predetermined thickness, opposite lateral projections on said body, elements on said lateral projections presenting inner opposed margins defining with the body a channel, and means constituting a longitudinal continuation of said body, forming spaced arms each terminating in a bevelled, knife-like end.

7. As an article of manufacture, a device for the purpose described, comprising a sheet metal member providing a planar body of predetermined thickness, means carried by said body and formed to have greater thickness than the thickness of the body, said means presenting inner opposed margins defining with the body a channel, and means constituting a longitudinal continuation of said body, forming arms curved out of the plane of said body.

8. As an article of manufacture, a device for the purpose described, comprising a sheet metal member providing a planar body and a longitudinal continuation thereof, formed to provide curved arms, said body having opposite lateral projections coplanar therewith, and plate-like elements on said projections, cooperating with said body to define a channel substantially longitudinally of the body, said body being apertured therethrough in the zone of said channel.

9. As an article of manufacture, a device for the purpose described, comprising a planar member having a longitudinal extension formed to provide curved arms, and plate-like elements in spaced relation on said member, formed to define with said member, a tapered channel, said member being apertured therethrough in the zone of said channel.

10. As an article of manufacture, a device for the purpose described, comprising a sheet metal member providing a planar body having lateral projections and a longitudinal extension, the latter being formed to provide spaced arms curved out of the plane of the body, plate-like elements on said lateral projections, the inner opposed margins of said elements cooperating in defining a tapered channel centrally of the body, and said body being apertured therethrough in the zone of said channel.

FRANKLIN G. HOBART.

REFERENCES CITED

The following references are of record in the file of this patent:

UNITED STATES PATENTS

| Number | Name | Date |
| --- | --- | --- |
| 771,571 | Pearson | Oct. 4, 1904 |
| 1,257,223 | Haltenberger | Feb. 19, 1918 |
| 1,558,885 | Hunt | Oct. 27, 1925 |
| 2,061,396 | Dehn | Nov. 17, 1936 |